United States Patent
Weisz et al.

(10) Patent No.: US 12,380,283 B2
(45) Date of Patent: Aug. 5, 2025

(54) SUMMARIZATION FOR ATTENTION MANAGEMENT AND RECALL

(71) Applicant: International Business Machines Corporation, Armonk, NY (US)

(72) Inventors: Justin David Weisz, Scarsdale, NY (US); Kristina Marie Brimijoin, Hastings-on-Hudson, NY (US); Stephanie Houde, Belmont, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 18/477,447

(22) Filed: Sep. 28, 2023

(65) Prior Publication Data

US 2025/0111166 A1 Apr. 3, 2025

(51) Int. Cl.
*G06F 40/40* (2020.01)
*G06F 16/334* (2025.01)
(Continued)

(52) U.S. Cl.
CPC .......... *G06F 40/40* (2020.01); *G06F 16/3344* (2019.01); *G06F 40/166* (2020.01); *G06F 40/284* (2020.01); *G06N 3/0455* (2023.01)

(58) Field of Classification Search
CPC .... G06F 40/40; G06F 16/3344; G06F 40/284; G06F 40/166; G06N 3/0455
See application file for complete search history.

(56) References Cited

U.S. PATENT DOCUMENTS 9,065,786 B2 6/2015 Plotkin
9,191,797 B2 11/2015 Alam
(Continued)

FOREIGN PATENT DOCUMENTS

| CN | 113014478 A | 6/2021 |
| CN | 115952272 B | 5/2023 |
| KR | 101749009 B1 | 6/2017 |

OTHER PUBLICATIONS

"Apply a sensitivity label to content automatically", Microsoft, Jul. 21, 2023, 29 pages, <https://learn.microsoft.com/en-us/purview/apply-sensitivity-label-automatically>.
(Continued)

*Primary Examiner* — Sonia L Gay
(74) *Attorney, Agent, or Firm* — Michael O'Keefe

(57) ABSTRACT

In an approach for assisting a user to remain focused on a task, a processor collects a plurality of information regarding one or more digital activities of a user. A processor tokenizes the plurality of information into one or more vectorized embeddings. Responsive to determining that the user has engaged a focus mode, a processor intercepts one or more communications. A processor synthesizes, utilizing a large language model and the one or more vectorized embeddings, one or more natural language responses to the one or more communications. A processor transmits the one or more natural language responses to one or more originating users of the one or more communications. Responsive to determining that the user has ended the focus mode, a processor displays a summary of the one or more communications and the one or more natural language responses transmitted while the user was in the focus mode.

20 Claims, 5 Drawing Sheets

(51) Int. Cl.
*G06F 40/166* (2020.01)
*G06F 40/284* (2020.01)
*G06N 3/0455* (2023.01)

(56) References Cited

U.S. PATENT DOCUMENTS

| | | | |
|---|---|---|---|
| 9,374,693 | B1 | 6/2016 | Olincy |
| 10,554,609 | B2 | 2/2020 | Muller |
| 10,868,842 | B2 | 12/2020 | Choe |
| 11,323,405 | B2 | 5/2022 | Muller |
| 11,410,643 | B2 | 8/2022 | Andreas |
| 11,496,620 | B1 | 11/2022 | Dressler |
| 11,630,958 | B2 | 4/2023 | Ronen |
| 2014/0370857 | A1* | 12/2014 | Bovis .............. H04M 3/436 455/414.1 |
| 2018/0213088 | A1* | 7/2018 | Choe .............. H04L 65/1016 |
| 2022/0237373 | A1 | 7/2022 | Singh Bawa |
| 2023/0020886 | A1 | 1/2023 | Mahapatra |

OTHER PUBLICATIONS

"Send automatic out of office replies from Outlook", Microsoft Support, Printed Aug. 1, 2023, 3 pages, <https://support.microsoft.com/en-us/office/send-automatic-out-of-office-replies-from-outlook-9742f476-5348-4f9f-997f-5e208513bd67>.

"Use Focus on your iPhone or iPad", Apple Support, Printed Aug. 1, 2023, 6 pages, <https://support.apple.com/en-us/HT212608>.

Brown et al., "Using Logs Data to Identify When Software Engineers Experience Flow or Focused Work", In Proceedings of the 2023 CHI Conference on Human Factors in Computing Systems (CHI '23). Association for Computing Machinery, New York, NY, USA, Article 867, pp. 1-12, <https://doi.org/10.1145/3544548.3581562>.

Cheron, Guy, "How to Measure the Psychological "Flow"? A Neuroscience Perspective," Frontiers in Psychology, Dec. 6, 2016, 6 pages, <https://www.frontiersin.org/articles/10.3389/fpsyg.2016.01823/full>.

Gonzalez et al., "Constant, constant, multi-tasking craziness: managing multiple working spheres", Proceedings of the CHI 2004 Conference on Human Factors in Computing Systems, Vienna Austria, Apr. 24-29, 2004, 8 pages, <https://dl.acm.org/doi/10.1145/985692.985707>.

Moneta, Giovanni B., "On the Measurement and Conceptualization of Flow," Advances in flow research, Chapter: 2, Jan. 2021, DOI: 10.1007/978-3-030-53468-4_2, <https://link.springer.com/chapter/10.1007/978-1-4614-2359-1_2>.

\* cited by examiner

SUMMARIZATION FOR ATTENTION MANAGEMENT AND RECALL

BACKGROUND OF THE INVENTION

The present invention relates generally to the field of data processing, and more particularly to summarization for attention management and recall.

Generative artificial intelligence (AI) generates images, music, speech, code, video, or text, while it interprets and manipulates pre-existing data. The machine-learning techniques behind generative AI have evolved over the past decade. The latest approach is based on a neural network architecture, coined "transformers." Combining transformer architecture with unsupervised learning, large foundation models emerged that outperform existing benchmarks capable of handling multiple data modalities. Large foundation models serve as the starting point for the development of more advanced and complex models. By building on top of a foundation model, a more specialized and sophisticated model tailored to specific use cases or domains can be created.

Large language models (LLM) are a type of generative pretrained transformers (GPT) that can create human-like text and code. LLMs are explicitly trained on large amounts of text data for Natural Language Processing (NLP) tasks and contained a significant number of parameters, usually exceeding 100 million. LLMs facilitate the processing and generation of natural language text for diverse tasks.

One diverse task is referred to as summarization. Summarization is a process of shortening a set of data computationally to create a subset of data (i.e. a summary) that represents the most important and/or most relevant information from the original content.

SUMMARY

Aspects of an embodiment of the present invention disclose a method, computer program product, and computer system for assisting a user to remain focused on a task during an implicitly or explicitly declared period of focused work by generating an intelligent summarization response to a communication request on behalf of the user. A processor collects a plurality of information regarding one or more digital activities of a user. A processor tokenizes the plurality of information into one or more vectorized embeddings and stores the one or more vectorized embeddings in a vector database. Responsive to determining that the user has engaged a focus mode, a processor intercepts one or more communications to be presented to the user based on one or more filters. A processor synthesizes, utilizing a large language model and the one or more vectorized embeddings, one or more natural language responses to the one or more communications. A processor transmits the one or more natural language responses to one or more originating users of the one or more communications based on a policy. Responsive to determining that the user has ended the focus mode, a processor displays a summary of the one or more communications and the one or more natural language responses transmitted while the user was in the focus mode.

In some aspects of an embodiment of the present invention, a processor retrieves a plurality of related content pertaining to the one or more communications from the vector database. A processor constructs a prompt for the large language model to perform a summarization task on the related content. A processor performs the summarization task on the related content based on the prompt.

In some aspects of an embodiment of the present invention, a natural language response of the one or more natural language responses is comprised of a section informing the one or more originating users of the one or more communications of the user being in the focus mode, a statement of an understanding of the one or more communications, and a summary of related content associated with the one or more communications.

In some aspects of an embodiment of the present invention, synthesizing, utilizing the large language model and the one or more vectorized embeddings, the one or more natural language responses to the one or more communications occurs in at least one of a zero-shot learning manner and a few-shot learning manner.

In some aspects of an embodiment of the present invention, a processor assigns one or more confidence scores to the one or more natural language responses. A processor compares the one or more confidence scores against a threshold within the policy. Responsive to at least one of the one or more confidence scores meeting or exceeding the threshold, a processor transmits respective one or more natural language responses associated with the at least one of the one or more confidence scores.

In some aspects of an embodiment of the present invention, a processor assigns one or more confidence scores to the one or more natural language responses. A processor compares the one or more confidence scores against a threshold from the policy. Responsive to at least one of the one or more confidence scores falling below the threshold, a processor sends respective one or more natural language responses associated with the at least one of the one or more confidence scores to the user for approval. Responsive to receiving approval from the user, a processor transmits the respective one or more natural language responses.

In some aspects of an embodiment of the present invention, the summary of the one or more communications and the one or more natural language responses transmitted to the user includes the one or more intercepted communications, a sender of the one or more intercepted communications, and an action taken in response to the one or more intercepted communications.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that workers have a hard time focusing. Frequent interruptions make it difficult for workers to stay focused on tasks that require extended periods of concentration. A study of workplace task management found that switching between tasks, tools, and communication channels is often initiated by external events such as new instant messaging notifications and new voice messages. Such changes in focus are costly and detrimental to completion of tasks requiring sustained careful attention.

Therefore, embodiments of the present invention recognize the need for and provide a system and method to assist a user to remain focused on a task during an implicitly or explicitly declared period of focused work by generating an intelligent summarization response to a communication request on behalf of the user. Prior to the user engaging in a period of focused work, embodiments of the present invention collect a plurality of information regarding one or more digital activities of the user and tokenizes the plurality of information into one or more meaningful units (i.e., one or more vectorized embeddings). Responsive to determining that the user has engaged in a period of focused work using a plurality of means (e.g., user specified, calendar, computer activity), embodiments of the present invention intercept one or more communications addressed to the user. Embodiments of the present invention then synthesize one or more natural language responses to the one or more communications addressed to the user using a large language model and the set of information regarding the one or more digital activities of the user collected. Embodiments of the present invention enable the user to ignore the one or more communications addressed to the user knowing that the sender will be provided with one or more natural language responses. Responsive to the user ending the period of focused work, embodiments of the present invention generate a summary of the one or more communications intercepted and the one or more natural language responses transmitted to the sender on the user's behalf thus enabling the user to follow up if necessary.

Implementation of embodiments of the present invention may take a variety of forms, and exemplary implementation details are discussed subsequently with reference to the Figures.

Figure 1:
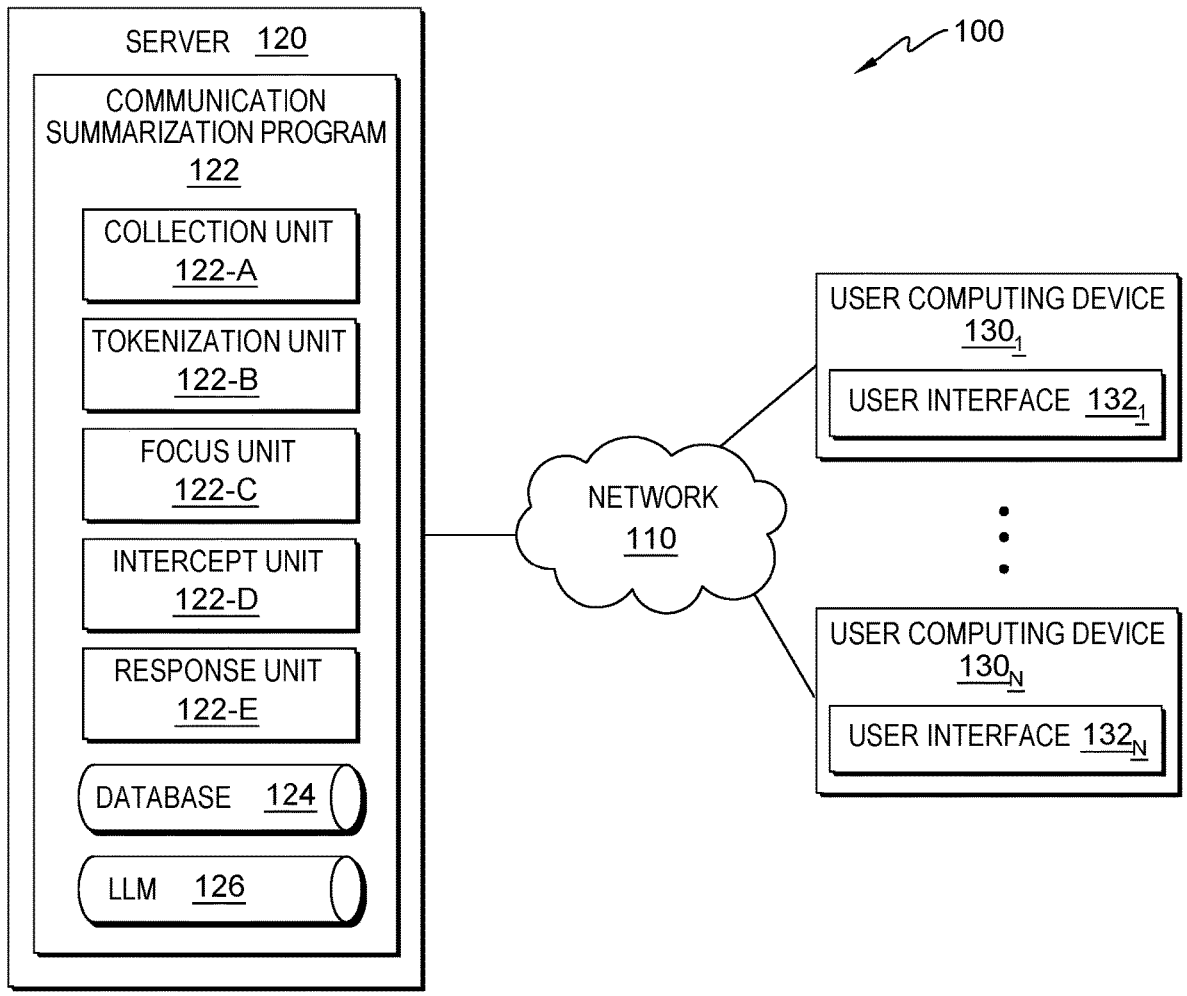
FIG. 1 is a functional block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing devices $130_{1-N}$, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing devices $130_{1-N}$, and other computing devices (not shown) within distributed data processing environment 100.

Server 120 operates to run communication summarization program 122 and to send and/or store data in database 124. In an embodiment, server 120 can send data from database 124 to user computing devices $130_{1-N}$. In an embodiment, server 120 can receive data in database 124 from user computing devices $130_{1-N}$. In an embodiment, server 120 includes communication summarization program 122, database 124, and large language model 126. Large Language Model (LLM) 126 operates to generate an intelligent natural language response to an intercepted communication request on behalf of the user and generate a summary of the one or more intercepted communications and the one or more intelligent natural language responses transmitted for the user. In one or more embodiments, server 120 can be a standalone computing device, a management server, a web server, a mobile computing device, or any other electronic device or computing system capable of receiving, sending, and processing data and capable of communicating with user computing devices $130_{1-N}$ via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing devices $130_{1-N}$ and other computing devices (not shown) within distributed data processing environment 100 via network 110. Server 120 may include internal and external hardware components, as depicted and described in further detail in FIG. 5.

Communication summarization program 122 operates to assist a user to remain focused on a task during an implicitly or explicitly declared period of focused work by generating an intelligent summarization response to a communication request on behalf of the user. In the depicted embodiment, communication summarization program 122 is a standalone program. In another embodiment, communication summarization program 122 may be integrated into another software product. In the depicted embodiment, communication summarization program 122 contains Collection Unit 122-A, Tokenization Unit 122-B, Focus Unit 122-C, Intercept Unit 122-D, and Response Unit 122-E. Collection Unit 122-A operates to collect a plurality of information regarding one or more digital activities of a user. Tokenization Unit 122-B operates to tokenize the plurality of information into one or more meaningful units (i.e., one or more vectorized embeddings) and to store the one or more vectorized embeddings in a vector database (e.g., database 124). Focus Unit 122-C operates to determine whether the user has engaged in a period of focused work and whether the user has ended the period of focused work. Responsive to determining that the user is engaged in a period of focused work using a plurality of means (e.g., user specified, calendar, computer activity), Intercept Unit 122-D operates to intercept one or more communications addressed to the user based on one or more filters. Response Unit 122-E operates to synthesize, utilizing a large language model and the one or more vectorized embeddings, one or more natural language responses to the one or more communications and to transmit the one or more natural language responses to one or more originating users of the one or more communications. Responsive to determining that the user has ended the period of focused work, Intercept Unit 122-D operates to display a summary of the one or more communications and the one or more transmitted natural language responses to the user. In the depicted embodiment, communication summarization program 122 resides on server 120. In another embodiment, communication summarization program 122 may reside on a user computing device (e.g., user computing device$_{1-N}$), provided that communication summarization program 122 has access to network 110. The operational steps of communication summarization program 122 are depicted and described in further detail with respect to FIG. 2. A first exemplary diagram of user interfaces utilizing communication summarization program 122 is depicted and described in further detail with respect to FIG. 3. A second exemplary diagram of user interfaces utilizing communication summarization program 122 is depicted and described in further detail with respect to FIG. 4.

In an embodiment, a user of a user computing device (e.g., user computing devices 130$_{1-N}$) registers with communication summarization program 122 of server 120. For example, the user completes a registration process (e.g., user validation), provides information to create a user profile, and authorizes the collection, analysis, and distribution (i.e., opts-in) of relevant data on an identified computing device (e.g., user computing devices 130$_{1-N}$) by server 120 (e.g., via communication summarization program 122). Relevant data includes, but is not limited to, personal information or data provided by the user; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by communication summarization program 122. A database is an organized collection of data. Data includes, but is not limited to, information about user preferences (e.g., general user system settings such as alert notifications for a user computing device (e.g., user computing devices 130$_{1-N}$)); information about alert notification preferences; a plurality of information regarding one or more digital activities of a user tokenized into one or more vectorized embeddings; a plurality of content related to one or more communications intercepted; and any other data received, used, and/or generated by communication summarization program 122.

Database 124 can be implemented with any type of device capable of storing data and configuration files that can be accessed and utilized by server 120, such as a hard disk drive, a database server, or a flash memory. In an embodiment, database 124 is accessed by communication summarization program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that communication summarization program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Communication summarization program 122 enables the authorized and secure processing of personal data and/or confidential company data.

Communication summarization program 122 provides informed consent, with notice of the collection of personal and/or confidential company data, allowing the user to opt-in or opt-out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Communication summarization program 122 provides information regarding personal and/or confidential company data and the nature (e.g., type, scope, purpose, duration, etc.) of the processing. Communication summarization program 122 provides the user with copies of stored personal and/or confidential company data. Communication summarization program 122 allows the correction or completion of incorrect or incomplete personal and/or confidential company data. Communication summarization program 122 allows for the immediate deletion of personal and/or confidential company data.

User computing devices 130$_{1-N}$ operate to run user interfaces 132$_{1-N}$ through which users can interact with communication summarization program 122 on server 120. In an embodiment, user computing devices 130$_{1-N}$ are devices that performs programmable instructions. For example, user computing devices 130$_{1-N}$ may be electronic devices, such as a laptop computer, a tablet computer, a netbook computer, a personal computer, a desktop computer, a smart phone, or any programmable electronic device capable of running user interfaces 132$_{1-N}$ and of communicating (i.e., sending and receiving data) with communication summarization program 122 via network 110. In general, user computing devices 130$_{1-N}$ represent any programmable electronic devices or a combination of programmable electronic devices capable of executing machine readable program instructions and communicating with other computing devices (not shown) within distributed data processing environment 100 via network 110. In the depicted embodiment, user computing devices 130$_{1-N}$ include instances of user interfaces 132$_{1-N}$.

User interfaces 132$_{1-N}$ operate as local user interfaces between communication summarization program 122 on server 120 and users of user computing devices 130$_{1-N}$. In some embodiments, user interfaces 132$_{1-N}$ are a graphical user interface (GUI), a web user interface (WUI), and/or a voice user interface (VUI) that can display (i.e., visually) or present (i.e., audibly) text, documents, web browser windows, user options, application interfaces, and instructions for operations sent from communication summarization program 122 to a user via network 110. User interfaces 132$_{1-N}$ can also display or present alerts including information (such as graphics, text, and/or sound) sent from communication summarization program 122 to a user via network 110. In an embodiment, user interfaces 132$_{1-N}$ can send and receive data (i.e., to and from communication summarization program 122 via network 110, respectively). Through user interfaces 132$_{1-N}$, users can opt-in to communication summarization program 122; input information; create a user profile; set user preferences and alert notification preferences; input one or more communications; receive one or more communications; input one or more natural language responses; approve or deny one or more natural language responses; receive one or more natural language responses; receive a request for feedback; and input feedback.

A user preference is a setting that can be customized for a particular user. A set of default user preferences are assigned to each user of communication summarization program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of communication summarization program 122.

Figure 2:
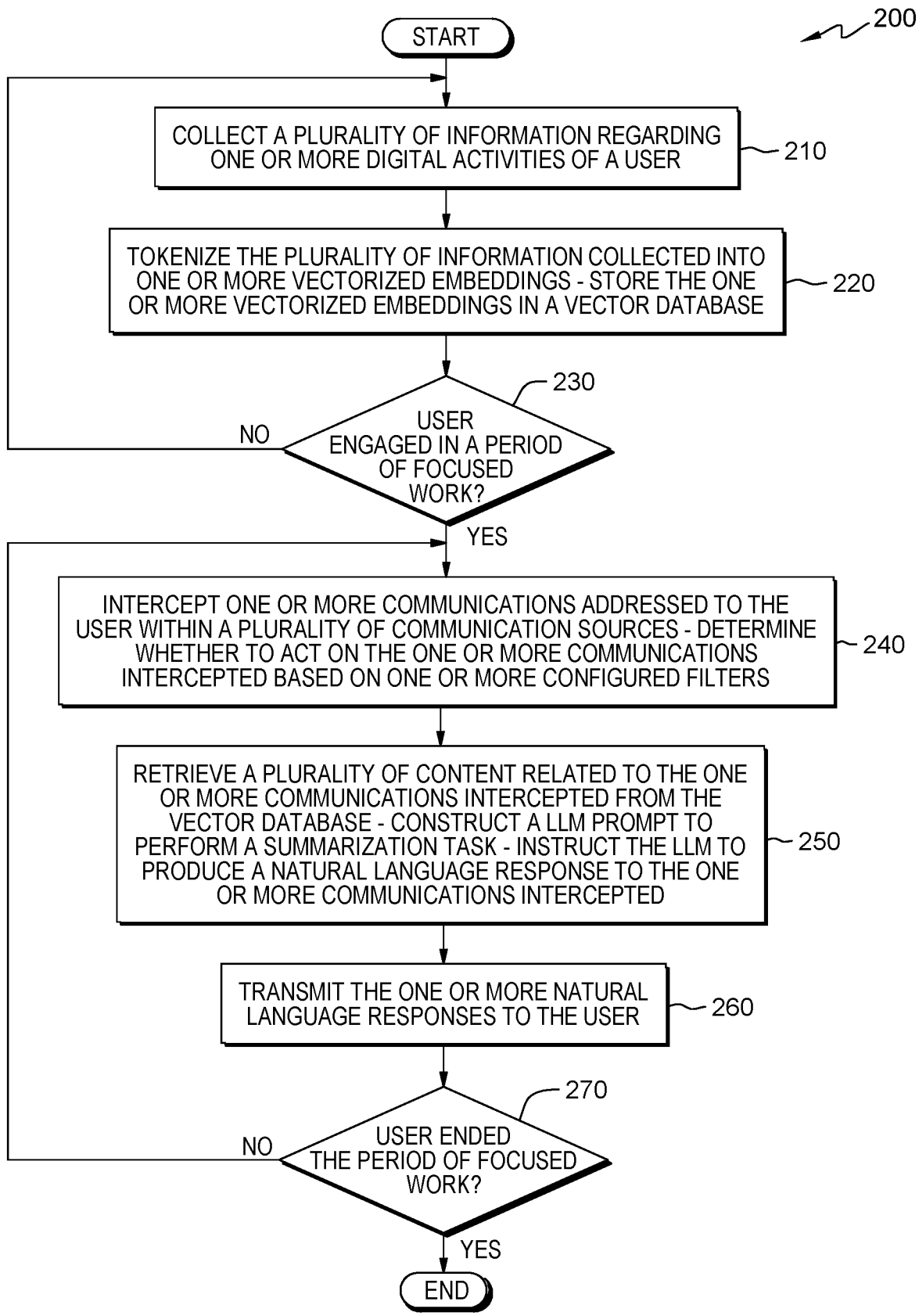
FIG. 2 is a flowchart illustrating the operational steps of a communication summarization program, on a server within the distributed data processing environment of FIG. 1, in accordance with an embodiment of the present invention.

FIG. 2 is a flowchart, generally designated 200, illustrating the operational steps for communication summarization program 122, on server 120 within distributed data processing environment 100 of FIG. 1, in accordance with an embodiment of the present invention. In an embodiment, communication summarization program 122 operates to assist a user to remain focused on a task during an implicitly or explicitly declared period of focused work by generating an intelligent summarization response to a communication request on behalf of the user. It should be appreciated that the process depicted in FIG. 2 illustrates one possible iteration of the process flow, which may be repeated in a polling fashion (e.g., once a day) or in an on-demand fashion (e.g., whenever a new message is received, whenever a new file is uploaded, etc.).

In step 210, collection unit 122-A of communication summarization program 122 collects a plurality of information regarding one or more digital activities of a first user. In an embodiment, collection unit 122-A of communication summarization program 122 collects a plurality of information regarding one or more digital activities of a first user from one or more communication sources. The one or more digital activities of the first user collected from the one or more communication sources may include, but are not limited to, a chat message on a communication platform or a messaging platform; an email sent or an email received; a file; a code commit, a pull request, or a comment; a report from a project management tool; and a meeting transcript. The plurality of information collected is uniformly referred to as "data objects". Each data object may contain at least three attributes. The three attributes include, but are not limited to, a timestamp of when the plurality of information was created and/or last modified; a communication source of the plurality of information; and a textual content of the plurality of information. The plurality of information collected is in one or more formats. The one or more formats include, but are not limited to, a set of text and an image. In an embodiment, if the plurality of information contains more than one format, collection unit 122-A of communication summarization program 122 extracts a textual portion using a file-format specific parser. In some embodiments, a communication source from which the plurality of information is collected has an Application Programming Interface (API) to access content in an automated fashion. In an embodiment, collection unit 122-A of communication summarization program 122 collects a plurality of information regarding one or more digital activities of a first user in a polling fashion (e.g., once a day), or if an API allows, in an on-demand fashion (e.g., whenever a new message is received, whenever a new file is uploaded, etc.).

In step 220, tokenization unit 122-B of communication summarization program 122 tokenizes the plurality of information into one or more vectorized embeddings. In an embodiment, responsive to collecting the plurality of information regarding the one or more digital activities of the first user, tokenization unit 122-B of communication summarization program 122 tokenizes the plurality of information into one or more vectorized embeddings. In an embodiment, tokenization unit 122-B of communication summarization program 122 stores the one or more vectorized embeddings in a vector database (e.g., database 124). In an embodiment, tokenization unit 122-B of communication summarization program 122 stores the one or more vectorized embeddings in a plurality of forms. A form used when storing the one or more vectorized embeddings depends on the communication source from which the plurality of information was collected. The plurality of forms include, but are not limited to, an individual message, a partial transcript, an entire transcript, a summary of one or more transcripts, and a set of raw file content. In some embodiments, a summary of the one or more transcripts is produced using a large language model (LLM) (e.g., LLM 126). For example, a chat message from a communication platform is stored in a database as an individual message (e.g., one document in a database for each chat message), as an entire transcript (e.g., one document per conversation or per conversational thread), or as a summary of one or more transcripts (e.g., using a LLM (e.g., LLM 126) to produce a summary of a chat transcript). In another example, an email message is stored in a database as an individual message (e.g., one document in a database for each email message) or as a summary of one or more email threads (e.g., using a LLM (e.g., LLM 126) to synthesize a summary of an email thread). An email message may or may not have a header removed. In another example, a textual portion of a file is stored in a database as a set of raw file content or as a summary (i.e., using a LLM (e.g., LLM 126) to synthesize a summary). In some embodiments, a file may be stored in a database as a set of multiple documents (i.e., one base document with the file's initial content and one or more additional documents describing edited versions of the file (e.g., using a LLM (e.g., LLM 126) to synthesize a summary of the difference between version X and X+1 of the file)). In another example, a code is stored in a database in a similar manner as a file. In another example, a code-related artifact (e.g., a commit message, a pull request, and a comment) is stored in a database in a similar manner as a chat message. In another example, a set of textual data within a project management tool is stored in a database in a similar manner as a chat message. In another example, a meeting transcript is stored in a database in a similar manner as a chat message.

In decision step 230, focus unit 122-C of communication summarization program 122 determines whether the first user has engaged in a period of focused work (i.e., a focus mode). In an embodiment, responsive to tokenizing the plurality of information collected into the one or more vectorized embeddings, focus unit 122-C of communication summarization program 122 determines whether the first user has engaged in a period of focused work. In an embodiment, focus unit 122-C of communication summarization program 122 determines the first user has engaged in a period of focused work when an engagement is manually started by the first user (i.e., user specified, e.g., the first user manually selects an option in a dropdown menu to start communication summarization program 122 or the first user manually presets a time (e.g., 9:00 AM to 10:00 AM) to start communication summarization program 122). In another embodiment, focus unit 122-C of communication summarization program 122 determines the first user has engaged in a period of focused work based on a computer activity of the first user (i.e., analysis of a computer activity of the first user using a machine learning algorithm). A machine learning algorithm is used to determine when the first user is engaging in a period of focused work from one or more logs of software engineering activities, from on-body electronics, and/or from training a machine learning (ML) model with logged computer activity (e.g., based on keystrokes, active processes, and process switching). In another embodiment, focus unit 122-C of communication summarization program 122 determines the first user has engaged in a period of focused work based on a calendar activity of the first user. For example, a rule-based classifier may be used to determine that a calendar entry that uses language such as "focus time" or "working session" indicates a desired period of focused work. In an embodiment, responsive to determining that the first user has engaged in a period of focused work (decision step 230, YES branch), focus unit 122-C of communication summarization program 122 activates and proceeds to step 240, intercepting one or more communications addressed to the first user based on one or more filters. In an embodiment, responsive to determining that the first user has not engaged in a period of focused work (decision step 230, NO branch), focus unit 122-C of communication summarization program 122 returns to step 210, collecting a next plurality of information regarding one or more digital activities of the first user.

In step 240, intercept unit 122-D of communication summarization program 122 intercepts one or more communications addressed to the first user. In an embodiment, responsive to determining that the first user is engaged a period of focused work, intercept unit 122-D of communication summarization program 122 intercepts one or more communications addressed to the first user. In an embodiment, intercept unit 122-D of communication summarization program 122 intercepts one or more communications addressed to the first user and sent by one or more second users in the one or more communication sources (e.g., a chat message on a communication platform or a messaging platform; an email sent or an email received; a file; a code commit, a pull request, or a comment; a report from a project management tool; and a meeting transcript). In an embodiment, intercept unit 122-D of communication summarization program 122 intercepts one or more communications addressed to the first user before the one or more communications are presented to the first user via a user interface (e.g., user interface $132_1$) of a user computing device (e.g., user computing device $130_1$).

In an embodiment, subsequent to intercepting the one or more communications addressed to the first user, intercept unit 122-D of communication summarization program 122 determines whether a response is needed for the one or more communications intercepted. In an embodiment, intercept unit 122-D of communication summarization program 122 determines whether a response is needed for the one or more communications intercepted based on a pre-configured filter. A pre-configured filter includes, but is not limited to, an option to provide a response to all communications intercepted; an option to provide a response only to communications intercepted on a specific topic or project (e.g., as determined by a set of keywords or a machine learning classifier trained to determine whether a given message is related to a topic or project); and an option to provide a response only to communications intercepted from a specific person (e.g., as determined by a name, an email address, an instant messenger handle, a job title, or a position in an organization specified). In an embodiment, subsequent to filtering the one or more communications, intercept unit 122-D of communication summarization program 122 directs the one or more communications intercepted to response unit 122-E of communication summarization program 122.

In another embodiment, intercept unit 122-D of communication summarization program 122 does not apply a pre-configured filter to the one or more communications intercepted but rather directs the one or more communications intercepted directly to the first user. In an embodiment, intercept unit 122-D of communication summarization program 122 directs the one or more communications intercepted to the first user based on a pre-set user preference. The pre-set user preference includes, but is not limited to, opting to receive one or more communications intercepted from a second user specially designated (e.g., designated as "urgent" or "important") regardless of the first user being engaged in a period of focused work and opting to receive one or more communications intercepted when the one or more communications intercepted are specially designated (e.g., designated as "urgent" or "important") regardless of the first user being engaged in a period of focused work. In an embodiment, intercept unit 122-D of communication summarization program 122 directs the one or more communications intercepted to the first user via a user interface (e.g., user interface $132_1$) of a user computing device (e.g., user computing device $130_1$).

In step 250, response unit 122-E of communication summarization program 122 constructs one or more natural language responses to the one or more communications intercepted. In an embodiment, responsive to receiving the one or more communications and determining to act on the one or more communications, response unit 122-E of communication summarization program 122 constructs one or more natural language responses to the one or more communications intercepted.

In an embodiment, response unit 122-E of communication summarization program 122 retrieves a plurality of content related to the one or more communications intercepted from the vector database (e.g., database 124). In an embodiment, response unit 122-E of communication summarization program 122 retrieves a plurality of content related to the one or more communications intercepted using the one or more communications intercepted as a lookup key. For example, the one or more communications are embedded and the embedding is used to search the vector database (e.g., vector database 124).

In an embodiment, response unit 122-E of communication summarization program 122 constructs a LLM prompt. In an embodiment, response unit 122-E of communication summarization program 122 constructs a LLM prompt to instruct the LLM (e.g., LLM 126) to perform a summarization task. A relevant result of a summarization task is included in a LLM prompt. A summarization task includes, but is not limited to, generating one or more intelligent natural language responses to one or more intercepted communication requests on behalf of the first user and generating a summary of the one or more intercepted communications and the one or more intelligent natural language responses transmitted for the user. An intelligent natural language response to an intercepted communication request is a subset of data (i.e., a summary) representing the most important and/or most relevant information from the intercepted communication request. In an embodiment, response unit 122-E of communication summarization program 122 constructs a LLM prompt in a zero-shot learning manner. A zero-shot learning manner is a problem setup in a machine learning system where, at test time, a learner observes one or more samples from one or more classes which were not observed during training and predicts a class to which the one or more samples belong. A zero-shot learning manner means no prior example of summarization is required. A zero-shot learning manner works by associating observed and non-observed classes through some form of auxiliary information, which encodes observable distinguishing properties of objects. In another embodiment, response unit 122-E of communication summarization program 122 constructs a LLM prompt in a few-shot learning manner. A few-shot learning manner is a problem setup in a machine learning system where, at test time, a pre-trained model generalizes over new categories of data (that the pre-trained model has not seen during training) using only a few labeled samples per class. A few-shot learning manner means prior examples of summarization are included.

In an embodiment, using the LLM prompt, response unit 122-E of communication summarization program 122 instructs the LLM (e.g., LLM 126) to perform the summarization task. In an embodiment, response unit 122-E of communication summarization program 122 performs a summarization task. In an embodiment, response unit 122-E of communication summarization program 122 performs a summarization task on the one or more communications using the LLM prompt. In an embodiment, response unit 122-E of communication summarization program 122 performs a summarization task on the retrieved plurality of content related to the one or more communications using the LLM prompt.

In an embodiment, response unit 122-E of communication summarization program 122 synthesizes one or more natural language responses to the one or more communications. The one or more natural language responses include, but are not limited to, a section informing the one or more second users (i.e., the one or more originating users or the one or more message senders) of the first user being engaged in an ongoing period of focused work, a statement of an understanding of the one or more communications (i.e., an understanding of the one or more second users' inquiries), and a summary of related content associated with the one or more communications (i.e., related content associated with the one or more second users' inquiries). In an embodiment, response unit 122-E of communication summarization program 122 synthesizes one or more natural language responses to the one or more communications utilizing the LLM (e.g., LLM 126) and the one or more vectorized embeddings. In an embodiment, response unit 122-E of communication summarization program 122 synthesizes one or more natural language responses to the one or more communications in a zero-shot learning manner. In another embodiment, response unit 122-E of communication summarization program 122 synthesizes one or more natural language responses to the one or more communications in a few-shot learning manner. In an embodiment, response unit 122-E of communication summarization program 122 synthesizes one or more natural language responses to the one or more communications that are content-grounded. A content-grounded response is a natural language response incorporating a set of information responsive to the one or more communications intercepted (i.e., more than a generic response indicating that the message recipient is in a period of focused work and should not be disturbed). In another embodiment, response unit 122-E of communication summarization program 122 synthesizes one or more natural language responses that are not content-grounded responses. In an embodiment, responsive to generating a response that is not content-grounded, response unit 122-E of communication summarization program 122 generates a generic response indicating that the first user is in a period of focused work and should not be disturbed (i.e., similar to a status message used in a communication system).

In step 260, response unit 122-E of communication summarization program 122 transmits the one or more natural language responses to the one or more second users. In an embodiment, responsive to generating a content-grounded response, response unit 122-E of communication summarization program 122 transmits the one or more natural language responses to the one or more second users. In an embodiment, response unit 122-E of communication summarization program 122 transmits the one or more natural language responses to the one or more second users based on a policy that is pre-configured by the first user. In another embodiment, response unit 122-E of communication summarization program 122 transmits the one or more natural language responses to the one or more second users based on a policy that is selected by computing a confidence score for each natural language response of the one or more natural language responses (e.g., by aggregating one or more output token probabilities) and determining if the confidence score exceeds a user-specified threshold of quality (e.g., by comparing the confidence score against a threshold comprising the policy). In an embodiment, responsive to one or more confidence scores meeting or exceeding the threshold, response unit 122-E of communication summarization program 122 transmits the one or more natural language responses associated with the one or more confidence scores to the one or more second users without human intervention. In an embodiment, responsive to one or more confidence scores falling below the threshold, response unit 122-E of communication summarization program 122 transmits the one or more natural language responses to the first user via a user interface (e.g., user interface $132_1$) of a user computing device (e.g., user computing device $130_1$) for approval. In an embodiment, responsive to receiving approval from the first user, response unit 122-E of communication summarization program 122 transmits the one or more natural language responses to the one or more second users via a user interface (e.g., user interface $132_N$) of a user computing device (e.g., user computing device $130_N$). In another embodiment, responsive to generating a response that is not content-grounded, response unit 122-E of communication summarization program 122 ignores the request.

For example, Michael received a message from Bob in which Bob asked Michael, "what's the state of the carbon capture project?" The following information is relevant to answering Bob's question to Michael. Michael sent an email to Jane yesterday, stating, "The carbon capture project is going well. We made a breakthrough yesterday, but we need extra time to analyze the data." Michael received an instant message from Richard today, stating, "Just wanted to let you know we started the data analysis this morning." Michael responded to the instant message from Richard today, stating, "That's great. Do you think you can finish it by noon?" Richard responded to the instant message from Michael today, stating, "Yes, it should not be a problem." Based on the relevant information, a response is constructed by response unit 122-E of communication summarization program 122 to inform Bob that Michael is in a period of focused work; to state that response unit 122-E of communication summarization program 122 is providing a response to Bob's question, "what's the state of the carbon capture project?"; to summarize the relevant information listed; and to state that response unit 122-E of communication summarization program 122's summary may be inaccurate and that the details should be verified with Michael at a later time.

In decision step 270, focus unit 122-C of communication summarization program 122 determines whether the first user has ended the period of focused work. In an embodiment, focus unit 122-C of communication summarization program 122 determines whether the first user has ended the period of focused work when an engagement is manually ended by the first user (i.e., user specified, e.g., first user manually selects an option in a dropdown menu to end communication summarization program 122 or the first user manually presets a time (e.g., 9:00 AM to 10:00 AM) to end communication summarization program 122). In another embodiment, focus unit 122-C of communication summarization program 122 determines whether the first user has ended the period of focused work based on a computer activity of the first user (i.e., analysis of a computer activity of the first user using a machine learning algorithm). In another embodiment, focus unit 122-C of communication summarization program 122 determines whether the first user has ended the period of focused work based on a calendar activity of the first user. In an embodiment, responsive to determining that the first user has ended the period of focused work (i.e., upon deactivation) (decision step 270, YES branch), focus unit 122-C of communication summarization program 122 produces a summary of the one or more intercepted communications and the one or more natural language responses transmitted to the second user on behalf of the first user. In an embodiment, focus unit 122-C of communication summarization program 122 produces the summary using the LLM (e.g., LLM 126). In an embodiment, focus unit 122-C of communication summarization program 122 produces the summary to output to the first user via a user interface (e.g., user interface $132_1$) of a user computing device (e.g., user computing device $130_1$). The format of the summary may be, but is not limited to, a list and a textual summary. The list may indicate the one or more intercepted communications, the sender of the one or more intercepted communications, and the system's action. The textual summary may specify the number of intercepted messages and the topics of those messages. In an embodiment, responsive to determining that the first user has not ended the period of focused work (decision step 270, NO branch), focus unit 122-C of communication summarization program 122 continues to monitor for the end of the period of focused work.

Figure 3:
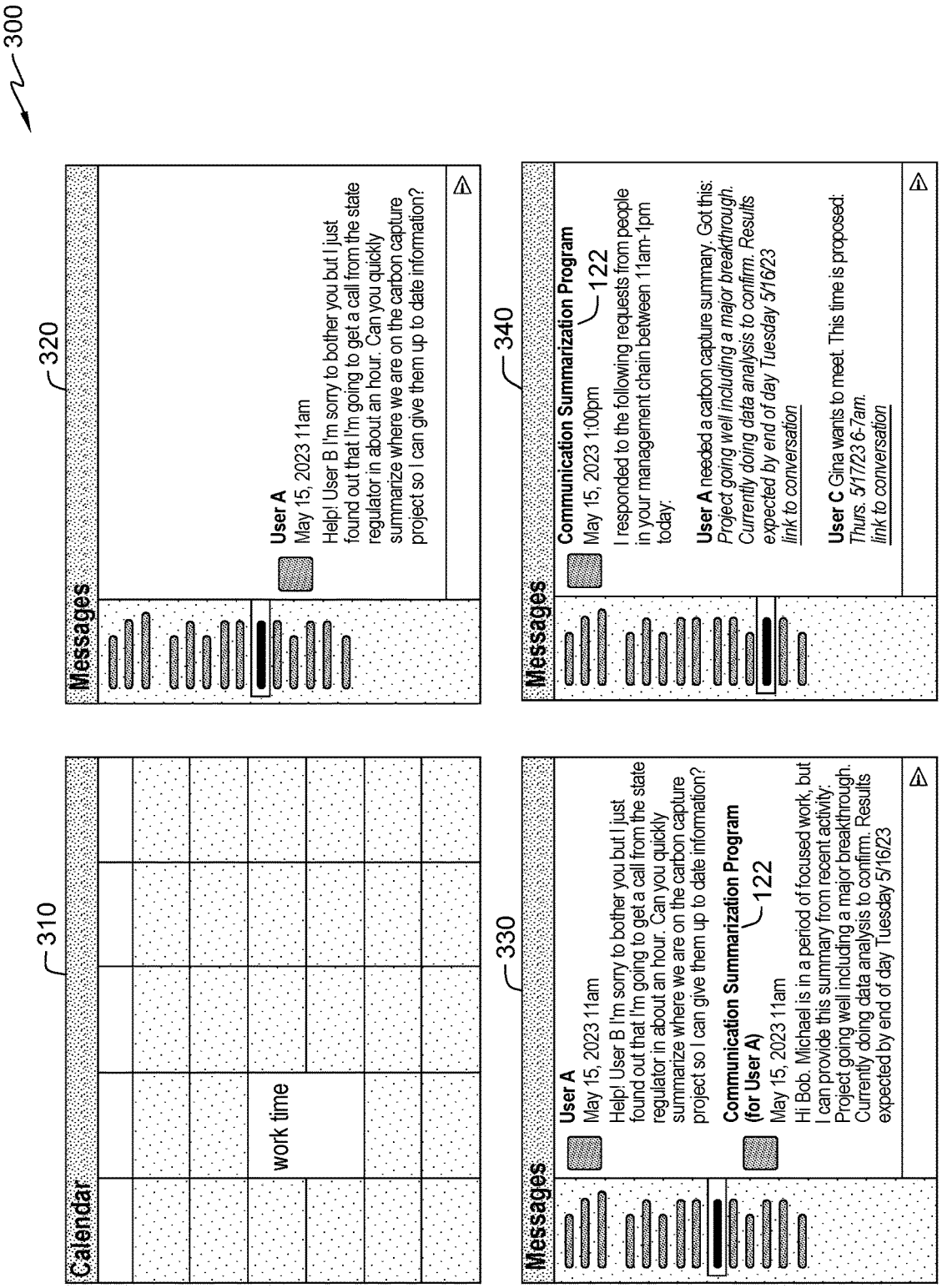
FIG. 3 is an exemplary diagram illustrating a first plurality of user interfaces displaying a user experience of the communication summarization program, in accordance with an embodiment of the present invention.

FIG. 3 depicts a diagram, generally designated 300, illustrating a first plurality of user interfaces displaying a user experience of communication summarization program 122, on server 120 within distributed data processing environment 100 of FIG. 1, in accordance with an embodiment of the present invention. In an embodiment, user M is a manager at a large green energy company. User M has been in a lot of meetings today. User M blocked off a two-hour period of time on his calendar to complete a proposal for a new geo-thermal drilling protocol. The two-hour period of time is illustrated, for example, in 310. In an embodiment, at the same time, user M's colleague, user B, needs an update on the carbon capture project from user M before a government regulator call that is happening within the hour. User B messages user M urgently asking for the update. User B's message to user M reads, "Hey user M. I am sorry to bother you, but I just found out that I am going to get a call from the state regulator in about an hour. Can you quickly summarize where we are on the carbon capture project so I can give them up to date information?" User B's message to user M is illustrated, for example, in 320. User B has enabled communication summarization program 122 to act. Communication summarization program 122 detects that user M is in a period of focused work and responds on user M's behalf. Communication summarization program 122 generates a response to user B that reads, "Hi user B. User M is in a period of focused work, but I can provide this summary from recent activity: Project is going well including a major breakthrough. Currently doing data analysis to confirm. Results expected by end of day Tuesday 5/16/23." The response generated is illustrated, for example, in 330. After finishing his proposal, communication summarization program 122 enables user M to review a summary of all communications that were made on user M's behalf during user M's focused work time. Each summary has a link to a corresponding channel where the communication was made. Communication summarization program 122 provides a message to user M that reads, "I responded to the following requests from people in your management chain between 11 am-1 pm today: User B needed a carbon capture summary. Got this: Project going well including a major breakthrough. Currently doing data analysis to confirm. Results expected by end of day Tuesday 5/16/23. Link to conversation. User G wants to meet. This time was proposed: Thursday, 5/17/2023 6-7 AM. Link to conversation." The message is illustrated, for example, in 340. It should be appreciated that FIG. 3 provides only an illustration of one implementation and does not imply any limitations with regard to the environments in which different embodiments can be implemented. Many modifications to the depicted environment can be made.

Figure 4:
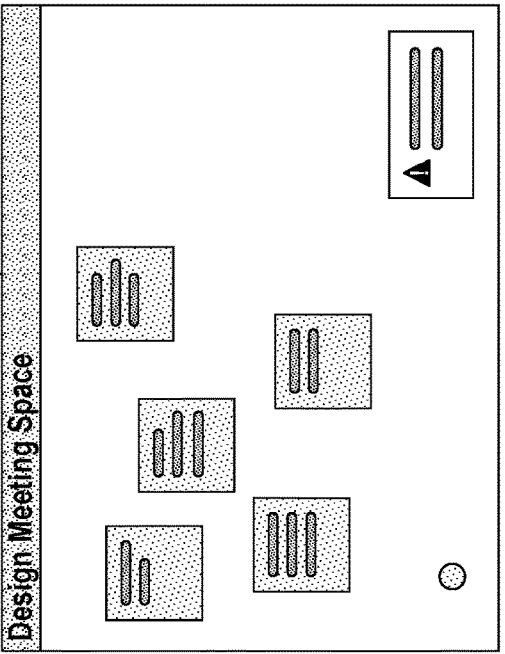
FIG. 4 is an exemplary diagram illustrating a second plurality of user interfaces displaying a process of configuring a focus time, in accordance with an embodiment of the present invention.
Figure 4:
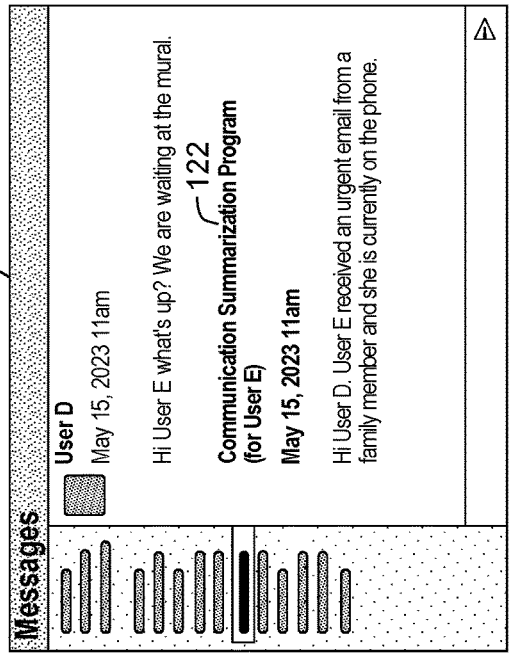
Figure 4:
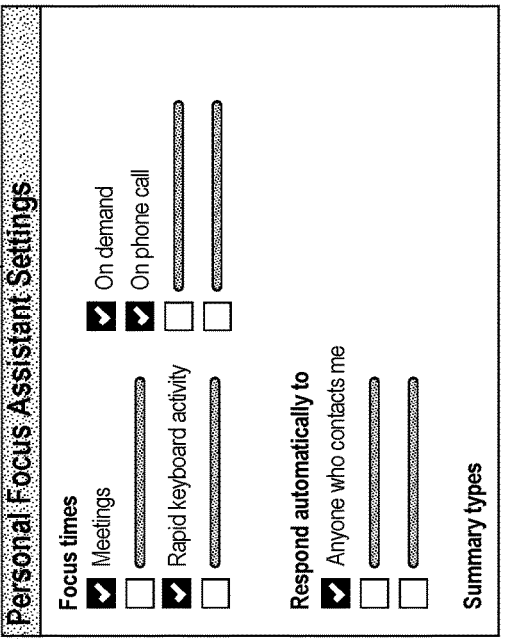
Figure 4:
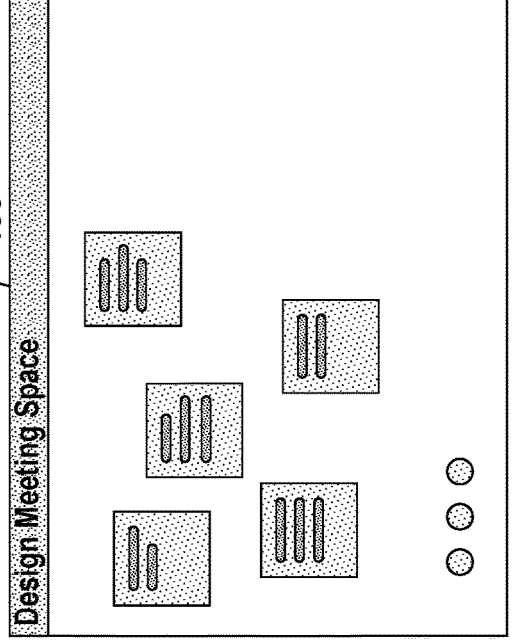

FIG. 4 depicts a diagram, generally designated 400, illustrating a second plurality of user interfaces displaying a process of configuring a focus time, on server 120 within distributed data processing environment 100 of FIG. 1, in accordance with an embodiment of the present invention. In an embodiment, user J is new to communication summarization program 122. User J configures user J's preferences for one or more system operations by filling out one or more optional settings that may be changed at any time. User J opts to have the system detect when user J is in meetings, typing rapidly, on the phone, or when user J chooses (i.e., on demand). User J's preferences are illustrated, for example, in 410. In an embodiment, user J is working on a virtual mural space to get ready for an upcoming meeting when she sees an email marked urgent from a family member. User J immediately reads the message and calls the family member. The email marked urgent is illustrated, for example, in 420. User J is still talking on the phone when the meeting starts. Several team members join the meeting space, but user J does not join. The meeting space is illustrated, for example, in 430. User A instant messages user J to remind user J of the meeting. Communication summarization program 122 responds on user J's behalf to let user A know that user J is on the phone. The response from communication summarization program 122 is illustrated, for example, in 440. It should be appreciated that FIG. 4 provides only an illustration of one implementation and does not imply any limitations with regard to the environments in which different embodiments can be implemented. Many modifications to the depicted environment can be made.

Figure 5:
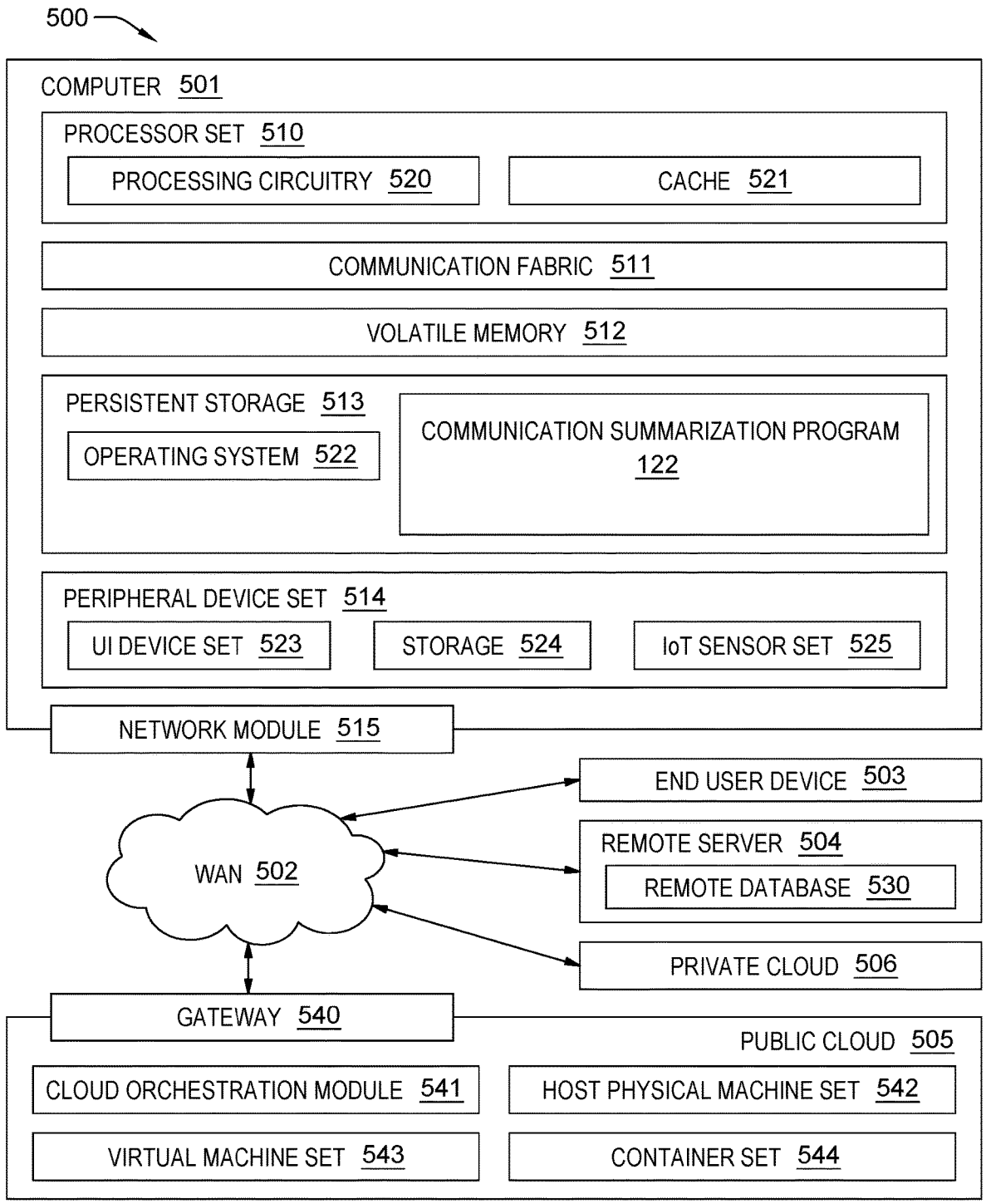
FIG. 5 depicts a block diagram of components of a computing environment representing the distributed data processing environment of FIG. 1, in accordance with an embodiment of the present invention.

FIG. 5 depicts a block diagram of components of server 120 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing environment 500 contains an example of an environment for the execution of at least some of the computer code involved in performing the inventive methods, such as communication summarization program 122. In addition to communication summarization program 122, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and communication summarization program 122, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in communication summarization program 122 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in communication summarization program 122 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    collecting, by one or more processors, a plurality of information regarding one or more digital activities of a user;
    tokenizing, by the one or more processors, the plurality of information into one or more vectorized embeddings and storing the one or more vectorized embeddings in a vector database;
    responsive to determining that the user has engaged a focus mode, intercepting, by the one or more processors, one or more communications to be presented to the user based on one or more filters;
    synthesizing, by the one or more processors, utilizing a large language model and the one or more vectorized embeddings, one or more natural language responses to the one or more communications;
    transmitting, by the one or more processors, the one or more natural language responses to one or more originating users of the one or more communications based on a policy; and
    responsive to determining that the user has ended the focus mode, displaying, by the one or more processors, a summary of the one or more communications and the one or more natural language responses transmitted while the user was in the focus mode.

2. The computer-implemented method of claim 1, wherein synthesizing, utilizing the large language model and the one or more vectorized embeddings, the one or more natural language responses to the one or more communications further comprises:
    retrieving, by the one or more processors, a plurality of related content pertaining to the one or more communications from the vector database;
    constructing, by the one or more processors, a prompt for the large language model to perform a summarization task on the related content; and
    performing, by the one or more processors, the summarization task on the related content based on the prompt.

3. The computer-implemented method of claim 1, wherein a natural language response of the one or more natural language responses is comprised of a section informing the one or more originating users of the one or more communications of the user being in the focus mode, a statement of an understanding of the one or more communications, and a summary of related content associated with the one or more communications.

4. The computer-implemented method of claim 1, wherein synthesizing, utilizing the large language model and the one or more vectorized embeddings, the one or more natural language responses to the one or more communications occurs in at least one of a zero-shot learning manner and a few-shot learning manner.

5. The computer-implemented method of claim 1, wherein transmitting the one or more natural language responses to the one or more originating users of the one or more communications based on the policy further comprises:
   assigning, by the one or more processors, one or more confidence scores to the one or more natural language responses;
   comparing, by the one or more processors, the one or more confidence scores against a threshold within the policy; and
   responsive to at least one of the one or more confidence scores meeting or exceeding the threshold, transmitting, by the one or more processors, respective one or more natural language responses associated with the at least one of the one or more confidence scores.

6. The computer-implemented method of claim 1, wherein transmitting the one or more natural language responses to the one or more originating users of the one or more communications based on the policy further comprises:
   assigning, by the one or more processors, one or more confidence scores to the one or more natural language responses;
   comparing, by the one or more processors, the one or more confidence scores against a threshold from the policy;
   responsive to at least one of the one or more confidence scores falling below the threshold, sending, by the one or more processors, respective one or more natural language responses associated with the at least one of the one or more confidence scores to the user for approval; and
   responsive to receiving approval from the user, transmitting, by the one or more processors, the respective one or more natural language responses.

7. The computer-implemented method of claim 1, wherein the summary of the one or more communications and the one or more natural language responses transmitted to the user includes the one or more intercepted communications, a sender of the one or more intercepted communications, and an action taken in response to the one or more intercepted communications.

8. A computer program product comprising:
   one or more computer readable storage media and program instructions stored on the one or more computer readable storage media, the program instructions comprising:
   program instructions to collect a plurality of information regarding one or more digital activities of a user;
   program instructions to tokenize the plurality of information into one or more vectorized embeddings and store the one or more vectorized embeddings in a vector database;
   responsive to determining that the user has engaged a focus mode, program instructions to intercept one or more communications to be presented to the user based on one or more filters;
   program instructions to synthesize, utilizing a large language model and the one or more vectorized embeddings, one or more natural language responses to the one or more communications;
   program instructions to transmit the one or more natural language responses to one or more originating users of the one or more communications based on a policy; and
   responsive to determining that the user has ended the focus mode, program instructions to display a summary of the one or more communications and the one or more natural language responses transmitted while the user was in the focus mode.

9. The computer program product of claim 8, wherein synthesizing, utilizing the large language model and the one or more vectorized embeddings, the one or more natural language responses to the one or more communications further comprises:
   program instructions to retrieve a plurality of related content pertaining to the one or more communications from the vector database;
   program instructions to construct a prompt for the large language model to perform a summarization task on the related content; and
   program instructions to perform the summarization task on the related content based on the prompt.

10. The computer program product of claim 8, wherein a natural language response of the one or more natural language responses is comprised of a section informing the one or more originating users of the one or more communications of the user being in the focus mode, a statement of an understanding of the one or more communications, and a summary of related content associated with the one or more communications.

11. The computer program product of claim 8, wherein synthesizing, utilizing the large language model and the one or more vectorized embeddings, the one or more natural language responses to the one or more communications occurs in at least one of a zero-shot learning manner and a few-shot learning manner.

12. The computer program product of claim 8, wherein transmitting the one or more natural language responses to the one or more originating users of the one or more communications based on the policy further comprises:
   program instructions to assign one or more confidence scores to the one or more natural language responses;
   program instructions to compare the one or more confidence scores against a threshold within the policy; and
   responsive to at least one of the one or more confidence scores meeting or exceeding the threshold, program instructions to transmit respective one or more natural language responses associated with the at least one of the one or more confidence scores.

13. The computer program product of claim 8, wherein transmitting the one or more natural language responses to the one or more originating users of the one or more communications based on the policy further comprises:
   program instructions to assign one or more confidence scores to the one or more natural language responses;
   program instructions to compare the one or more confidence scores against a threshold from the policy;
   responsive to at least one of the one or more confidence scores falling below the threshold, program instructions to send respective one or more natural language responses associated with the at least one of the one or more confidence scores to the user for approval; and
   responsive to receiving approval from the user, program instructions to transmit the respective one or more natural language responses.

14. The computer program product of claim 8, wherein the summary of the one or more communications and the one or more natural language responses transmitted to the user includes the one or more intercepted communications, a sender of the one or more intercepted communications, and an action taken in response to the one or more intercepted communications.

15. A computer system comprising:
one or more computer processors;
one or more computer readable storage media;
program instructions collectively stored on the one or more computer readable storage media for execution by at least one of the one or more computer processors, the stored program instructions comprising:
program instructions to collect a plurality of information regarding one or more digital activities of a user;
program instructions to tokenize the plurality of information into one or more vectorized embeddings and store the one or more vectorized embeddings in a vector database;
responsive to determining that the user has engaged a focus mode, program instructions to intercept one or more communications to be presented to the user based on one or more filters;
program instructions to synthesize, utilizing a large language model and the one or more vectorized embeddings, one or more natural language responses to the one or more communications;
program instructions to transmit the one or more natural language responses to one or more originating users of the one or more communications based on a policy; and
responsive to determining that the user has ended the focus mode, program instructions to display a summary of the one or more communications and the one or more natural language responses transmitted while the user was in the focus mode.

16. The computer system of claim 15, wherein synthesizing, utilizing the large language model and the one or more vectorized embeddings, the one or more natural language responses to the one or more communications further comprises:
program instructions to retrieve a plurality of related content pertaining to the one or more communications from the vector database;
program instructions to construct a prompt for the large language model to perform a summarization task on the related content; and
program instructions to perform the summarization task on the related content based on the prompt.

17. The computer system of claim 15, wherein a natural language response of the one or more natural language responses is comprised of a section informing the one or more originating users of the one or more communications of the user being in the focus mode, a statement of an understanding of the one or more communications, and a summary of related content associated with the one or more communications.

18. The computer system of claim 15, wherein synthesizing, utilizing the large language model and the one or more vectorized embeddings, the one or more natural language responses to the one or more communications occurs in at least one of a zero-shot learning manner and a few-shot learning manner.

19. The computer system of claim 15, wherein transmitting the one or more natural language responses to the one or more originating users of the one or more communications based on the policy further comprises:
program instructions to assign one or more confidence scores to the one or more natural language responses;
program instructions to compare the one or more confidence scores against a threshold within the policy; and
responsive to at least one of the one or more confidence scores meeting or exceeding the threshold, program instructions to transmit respective one or more natural language responses associated with the at least one of the one or more confidence scores.

20. The computer system of claim 15, wherein transmitting the one or more natural language responses to the one or more originating users of the one or more communications based on the policy further comprises:
program instructions to assign one or more confidence scores to the one or more natural language responses;
program instructions to compare the one or more confidence scores against a threshold from the policy;
responsive to at least one of the one or more confidence scores falling below the threshold, program instructions to send respective one or more natural language responses associated with the at least one of the one or more confidence scores to the user for approval; and
responsive to receiving approval from the user, program instructions to transmit the respective one or more natural language responses.

* * * * *